(12) United States Patent
Zhou et al.

(10) Patent No.: US 12,045,094 B2
(45) Date of Patent: *Jul. 23, 2024

(54) FLEXIBLE DISPLAY DEVICE HAVING SUPPORT LAYER

(71) Applicant: BOE TECHNOLOGY GROUP CO., LTD., Beijing (CN)

(72) Inventors: Yonghong Zhou, Beijing (CN); Shangchieh Chu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/877,355

(22) Filed: Jul. 29, 2022

(65) Prior Publication Data
US 2022/0365563 A1 Nov. 17, 2022

Related U.S. Application Data

(63) Continuation of application No. 16/633,075, filed as application No. PCT/CN2019/097688 on Jul. 25, 2019, now Pat. No. 11,449,103.

(30) Foreign Application Priority Data
Jul. 26, 2018 (CN) .......................... 201821194669.9

(51) Int. Cl.
G06F 1/16 (2006.01)

(52) U.S. Cl.
CPC .......... *G06F 1/1652* (2013.01); *G06F 1/1637* (2013.01)

(58) Field of Classification Search
CPC ..... G06F 1/1652; G06F 1/1681; G06F 1/1637
See application file for complete search history.

(56) References Cited

U.S. PATENT DOCUMENTS

| | | | |
|---|---|---|---|
| 10,541,373 B2* | 1/2020 | Park | H10K 50/84 |
| 10,681,194 B2* | 6/2020 | Lee | H04M 1/0268 |
| 10,838,452 B2* | 11/2020 | Siddiqui | G06F 1/1637 |
| 11,449,103 B2* | 9/2022 | Zhou | H05K 5/0017 |
| 2014/0029171 A1 | 1/2014 | Lee | |
| 2017/0123460 A1 | 5/2017 | Jung | |
| 2018/0343330 A1 | 11/2018 | Lin et al. | |

(Continued)

FOREIGN PATENT DOCUMENTS

| | | |
|---|---|---|
| CN | 103582340 A | 2/2014 |
| CN | 105611006 A | 5/2016 |

(Continued)

OTHER PUBLICATIONS

Restriction/Election Office Action issued on Jun. 30, 2021 for U.S. Appl. No. 16/633,075.

(Continued)

*Primary Examiner* — James Wu
(74) *Attorney, Agent, or Firm* — Nath, Goldberg & Meyer; Joshua B. Goldberg

(57) ABSTRACT

A flexible display device includes a flexible display screen having a bendable region; a housing around the flexible display screen; and a support layer having ductility between the housing and a back side of the flexible display screen. The support layer is at least partially on the bendable region of the flexible display screen.

12 Claims, 2 Drawing Sheets

(56) References Cited

U.S. PATENT DOCUMENTS

2019/0143664 A1    5/2019  Bi et al.

FOREIGN PATENT DOCUMENTS

CN    107908308 A    4/2018
CN    208607859 U    3/2019

OTHER PUBLICATIONS

Non-Final Rejection issued on Oct. 5, 2021 for U.S. Appl. No. 16/633,075.
Final Rejection issued on Feb. 2, 2022 for U.S. Appl. No. 16/633,075.
Examiner-Initiated Interview Summary conducted on Apr. 12, 2022 for U.S. Appl. No. 16/633,075.
International Search Report issued on Oct. 30, 2019 for application No. PCT/CN2019/097688 with English translation attached.

* cited by examiner

FLEXIBLE DISPLAY DEVICE HAVING SUPPORT LAYER

CROSS-REFERENCE TO RELATED APPLICATION

This is a continuation application of U.S. patent application Ser. No. 16/633,075 filed Jan. 22, 2020, which was a National Phase Application filed under 35 U.S.C. 371 as a national stage of PCT/CN2019/097688, filed on Jul. 25, 2019, an application claiming the priority of Chinese patent application No. 201821194669.9 entitled "flexible display device" filed on Jul. 26, 2018, the contents of each of which are incorporated herein in their entirety by reference.

TECHNICAL FIELD

The disclosure relates to the field of display technology, and in particular to a flexible display device.

BACKGROUND

A flexible display screen is generally formed by stacking a plurality of film layers and has a poor strength. The flexible display screen has a very thin cover plate and the touch sense is slightly poor when the flexible display screen is used by a user.

In addition, the flexible display screen is often switched between two different operation modes, i.e., a folded state and an unfolded state. When the flexible display screen is switched from the folded state to the unfolded state, a protrusion may appear at a folded position of the flexible display screen corresponding to a rotating shaft due to a poor restorability of the film layers of the flexible display screen.

In summary, the flexible display screen in the related art has a problem that the protrusion may appear at the folded position during the use, which results in a poor touch sense.

SUMMARY

The present disclosure provides a flexible display device including a flexible display screen having a bendable region; a housing around the flexible display screen; and a support layer having ductility between the housing and a back side of the flexible display screen, wherein the support layer is at least partially in the bendable region of the flexible display screen.

In some embodiments, the support layer is partially in the bendable region of the flexible display screen and partially extends to a non-bendable region of the flexible display screen.

In some embodiments, a surface of the support layer facing the flexible display screen is flat, and the support layer is attached to the flexible display screen snugly.

In some embodiments, the support layer is totally attached to the flexible display screen snugly by adhesive.

In some embodiments, the support layer is a metal layer, and a surface of the metal layer facing the housing is flat.

In some embodiments, the support layer is attached to the housing snugly.

In some embodiments, the support layer is totally attached to the housing snugly by glue.

In some embodiments, the housing includes a main structure and at least one side structure, the main structure being on the back side of the flexible display screen, the side structure being on an end face of the flexible display screen, and the support layer being coupled to the side structure of the housing through a snap fit structure.

In some embodiments, the housing includes two side structures on two opposite end faces of the flexible display screen, sides of the two side structures of the housing close to the flexible display screen are provided with two opposite groove structures, respectively, sides of the support layer close to the two groove structures are provided with two opposite protrusion structures, respectively, and each of the groove structures is coupled to its close protrusion structure in snap fit.

In some embodiments, the housing has a bendable region corresponding to the bendable region of the flexible display screen, the support layer includes a first metal layer and a second metal layer, the first metal layer is on the back side of the flexible display screen, the second metal layer is on a side of the first metal layer close to the housing and on both sides of the bendable region of the housing; and the two protrusion structures are on the second metal layer at positions close to the two opposite groove structures.

In some embodiments, the main structure of the housing includes a first portion and a second portion on two sides of the bendable region of the housing, and the bendable region between the first portion and the second portion is provided with a rotating shaft configured to allow the first portion and the second portion to rotate relatively to make the housing bent; a first accommodating space and a second accommodating space are between the second metal layer on the two sides of the bendable region of the housing and an inner surface of the housing respectively, the first accommodating space is provided with a circuit board, and at least one of an upper side and a lower side of the circuit board is provided with a chip; and the second accommodating space is provided with a battery.

In some embodiments, a side of the second metal layer or the first metal layer close to the circuit board is provided with a protrusion portion, and the protrusion portion is fixedly coupled to the circuit board.

In some embodiments, the protrusion portion is provided with a screw hole; the circuit board is provided with a through screw hole, and the circuit board is fixedly coupled to the protrusion portion through a screw.

In some embodiments, the housing comprises two side structures on two opposite end faces of the flexible display screen, sides of the two side structures of the housing close to the flexible display screen are provided with two opposite protrusion structures, respectively, sides of the support layer close to the two groove structures are provided with two opposite groove structures, respectively, and each of the groove structures is coupled to its close protrusion structure in snap fit.

In some embodiments, the housing has a bendable region corresponding to the bendable region of the flexible display screen, the support layer includes a first metal layer and a second metal layer, the first metal layer is on the back side of the flexible display screen, the second metal layer is on a side of the first metal layer close to the housing and on both sides of the bendable region; and the two groove structures are on the second metal layer at positions close to the two opposite protrusion structures, respectively.

In some embodiments, the protrusion portion on the second metal layer and the second metal layer are formed as a single piece; or the protrusion portion on the second metal layer is separately formed from the second metal layer and is coupled to the second metal layer through adhesive.

In some embodiments, the housing is provided with a rotating shaft in the bendable region of the housing, the support layer having ductility is a metal layer, an adsorption member formed of an electromagnet material is in the rotating shaft, and the adsorption member is configured to have magnetism to attract the support layer when being powered.

In some embodiments, the flexible display device further includes an angle sensor coupled to the rotating shaft and configured to sense an angle change of the rotating shaft relative to the flexible display screen; and a controller configured to control the adsorption member to be powered to have magnetism to attract the support layer when the angle sensor detects that the rotating shaft starts to rotate to make the flexible display screen unfolded from a folded state.

In some embodiments, the housing includes a main structure and a side structure, the main structure is on the back side of the flexible display screen, the side structure is on an end face of the flexible display screen, and a side of the support layer facing the main structure of the housing is provided with a functional layer; the functional layer includes a force touch layer, and the functional layer is attached to the housing and the support layer snugly.

In some embodiments, the flexible display screen includes a flexible display panel, a flexible touch layer between the flexible display panel and the support layer, and a flexible cover plate on the flexible display panel, the support layer being composed of a metal sheet while serving as an electrode of the flexible touch layer.

DETAILED DESCRIPTION

In order to make those skilled in the art better understand the technical solution of the present disclosure, the flexible display device provided in the present disclosure will be described in detail below with reference to the accompanying drawings.

Figure 1:
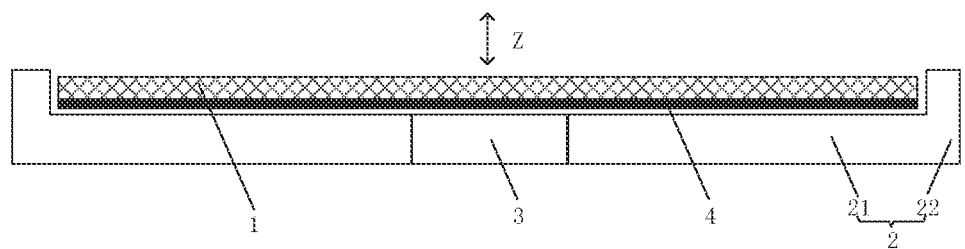
FIG. 1 is a schematic structural diagram of a flexible display device according to some embodiments of the present disclosure.

FIG. 1 is a schematic structural diagram of a flexible display device according to some embodiments of the present disclosure. As shown in FIG. 1, the flexible display device includes a flexible display screen 1 and a housing 2 on flexible display screen 1. The flexible display screen 1 and the housing 2 both have bendable regions. The bendable region of the housing 2 corresponds to the bendable region of the flexible display screen 1. That is, an orthographic projection of the bendable region of the flexible display screen 1 on a plane, on which the housing 2 is located, overlaps with the bendable region of the housing 2. The housing 2 includes a main structure 21 and a side structure 22, the main structure 21 is on a back side (a plane opposite to a light emitting surface of the flexible display screen) of the flexible display screen 1 and configured as a support plane for supporting the flexible display screen 1, and the side structure 22 is on the end face of the flexible display screen 1 and configured as a side perpendicular to the support plane for supporting the flexible display screen 1.

In some embodiments, the main structure 21 of the housing 2 is provided with a rotating shaft 3, and a first portion on one side of the rotating shaft 3 rotates around the rotating shaft 3 relative to a second portion on the other side of the rotating shaft 3 to make the housing 2 bent. Of course, both the first and second portions may rotate relative to the rotating shaft.

In other embodiments, the back side of the housing 2 is a whole plate without a rotating shaft, and a material of part of the housing 2 in the bendable region is bendable, such as copper or any other metal.

A support layer 4 is provided at the back side of the flexible display screen 1 to be between the back side of the flexible display 1 and the main structure 21. As an example, the support layer 4 is at least partially on the bendable region of the flexible display screen 1. As an example, the support layer 4 is on the bendable region of the flexible display screen 1 and extends to a non-bendable region.

The surface of the support layer 4 facing the flexible display screen 1 is flat, and the support layer 4 is attached to the flexible display screen 1 snugly. As an example, the support layer 4 is totally attached to the flexible display screen snugly by adhesive. "Attached to" of the present disclosure means that the support layer 4 and the flexible display 1 are coupled together by using an adhesive or a bonding agent, which has a sufficient adhesive strength after being cured so as to prevent the support layer 4 from falling off from the flexible display screen. As an example, the support layer 4 is attached to the flexible display screen 1 by double-sided adhesive tape or glue. In this embodiment, the support layer 4 is totally attached to the housing 2 snugly by adhesive. As an example, the support layer 4 is totally attached to the housing 2 snugly by glue.

The support layer 4 is made of a metallic or non-metallic material having ductility. As an example, the support layer 4 includes a metal sheet made of a metal material. The metal sheet is attached to the flexible display screen 1 by adhesive. In some embodiments, the metal sheet is a prefabricated metal sheet.

The support layer 4 is, for example, a glue layer including graphite mixed with a semiconductor material, and the glue layer may be adhesively attached to the flexible display screen 1 and the housing 2 without adhesive or an additional glue layer.

In this embodiment, the flexible display screen 1 includes a flexible display panel, a flexible touch module and a flexible cover plate, the flexible touch module is on the display surface of the flexible display panel, and the flexible cover plate is on the flexible touch module. The cover plate may be coupled to the touch module through optical adhesive. As an example, the touch module may be coupled to the display panel through optical adhesive. As an example, the cover plate may be totally attached to the touch module snugly by the optical adhesive, and as an example, the touch module can be totally attached to the display panel snugly by the optical adhesive.

In this embodiment, the main structure 21 and the side structure 22 are an integral structure as a single piece. The housing 2 accommodates the flexible display screen 1 with the main structure 21 on the back side of the flexible display screen 1, and the side structure 22 around the side of the flexible display screen 1. A front side of the flexible display screen 1 refers to a display surface of the flexible display screen 1 or a light emitting surface for light of a display image, and the back side of the flexible display screen 1 refers to the other side of the flexible display screen 1 opposite to the light emitting surface.

In this embodiment, the rotating shaft 3 may be in the bendable region of the main structure 21. The housing 2 makes the flexible display screen 1 folded by the rotation of the rotating shaft 3, resulting in the flexible display screen 1 in a folded state. The housing 2 on both sides of the rotating shaft 3 makes the flexible display screen 1 unfolded by the rotation of the rotating shaft 3, resulting in the flexible display screen 1 in an unfolded state. As an example, the rotating shaft 3 may be a rotating shaft for a conventional clamshell phone or a rotating shaft for a portable computer.

In this embodiment, the support layer 4 may be attached to the back side of the flexible display screen 1. As an example, the support layer 4 and the flexible display screen 1 are bonded together by a double-sided adhesive tape. When the flexible display screen 1 is changed from the folded state to the unfolded state, the quick resilience of the support layer 4 can pull the flexible display screen 1 to be unfolded, so that no protrusion appears at the folded position.

In this embodiment, the support layer 4 is on the back side of the flexible display screen 1, and provides a strong support for the flexible display screen 1, so as to reduce deformation of the flexible display screen 1 in a direction (Z direction) perpendicular to the surface of the flexible display screen 1. When the flexible display screen 1 is subjected to an external impact, the support layer 4 can prevent the flexible display screen 1 from being damaged due to excessive deformation.

In this embodiment, the flexible display screen 1 may generate heat during operation, the support layer 4 made of a metal material can spread the heat generated by the flexible display screen 1 towards any position of the whole support layer, and the heat can be conducted away through the housing, so that the lifetime of the flexible display screen 1 is increased. The support layer 4 made of the metal material, such as high-strength stainless steel, titanium alloy and memory alloy, can better conduct heat away, thereby further increasing the lifetime of the flexible display screen 1.

In this embodiment, when the user operates the flexible display device, the support layer 4 having a support function can improve touch sense, so as to reduce the soft feel of the flexible display screen 1 being touched.

In the technical solution of the flexible display device provided by this embodiment, the flexible display device includes the flexible display screen 1 and the housing 2 outside the flexible display screen. The housing 2 includes the main structure 21 provided with the rotating shaft 3 and side structure 22. The back side of the flexible display screen is provided with the support layer 4. The support layer 4 has the function of supporting the flexible display screen and reduces the inconvenience of touch operations due to the softness of the flexible display screen being touched. In this embodiment, the quick resilience of the support layer can pull the flexible display screen to be unfolded, so that no protrusion appears at the folded position.

Figure 2:
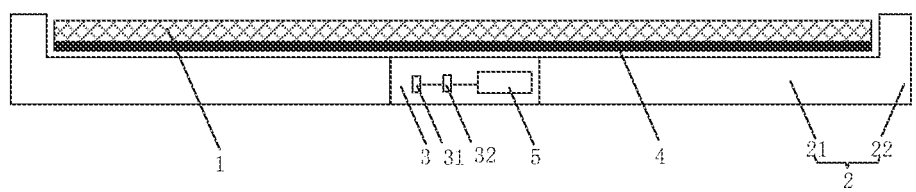
FIG. 2 is a schematic structural diagram of a flexible display device according to some embodiments of the present disclosure.

FIG. 2 is a schematic structural diagram of a flexible display device according to some embodiments of the present disclosure. As shown in FIG. 2, in this embodiment on the basis of the above embodiments, an electromagnet 5 is in the rotating shaft 3. The flexible display device further includes an angle sensor 31 and a controller 32 disposed in the rotating shaft 3. The angle sensor 31 is coupled to the rotating shaft 3 to sense the angle change of the rotating shaft relative to the flexible display screen. The controller 32 is configured to control the electromagnet 5 to be powered to generate magnetism that attracts the support layer 4 when the angle sensor 31 detects that the rotating shaft 3 starts to rotate to make the flexible display screen 1 unfolded from the folded state, so that the flexible display screen can be unfolded more quickly, resulting in the flexible display screen 1 in a desired unfolded state. In another embodiment, the controller is disposed on a circuit board outside the rotating shaft, is coupled to the angle sensor in the rotating shaft through a signal wire to send or receive a signal, and is coupled to the electromagnet to send or receive a signal.

In the technical solution of the flexible display device provided by this embodiment, the flexible display device includes the flexible display screen 1 and the housing 2 outside the flexible display screen 1. The housing 2 includes the main structure 21 provided with the rotating shaft 3 and the side structure 22. The support layer 4 is disposed on the back side of the flexible display screen, and in this embodiment, the support layer 4 has the function of supporting the flexible display screen 1 and reduces the inconvenience of touch operations due to the softness of the flexible display screen when touched. In this embodiment, the quick resilience of the support layer 4 can pull the flexible display screen to be unfolded, so that no protrusion appears at the folded position.

Figure 3:
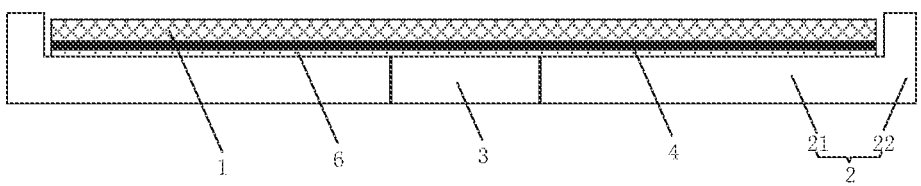
FIG. 3 is a schematic structural diagram of a flexible display device according to some embodiments of the present disclosure.

FIG. 3 is a schematic structural diagram of a flexible display device according to some embodiments of the present disclosure. As shown in FIG. 3, in this embodiment on the basis of the above embodiments, a functional layer 6 is on a side of the support layer 4 facing the main structure 21.

In this embodiment, the functional layer 6 is between the support layer 4 and the main structure 21, and the functional layer 6 is snugly attached to a side of the support layer 4 facing the main structure 21 by a double-sided adhesive tape.

As an example, the functional layer 6 includes a force touch layer. The support layer 4 can support and protect the force touch layer.

As an example, when the support layer 4 is a metal sheet, a layer of rubber material is compounded to the metal sheet, and the two materials are integrally molded by an insert molding process to improve buffering capability of the flexible display screen. Therefore, the impact resistance of the whole device can be improved by compounding a buffer layer on the metal sheet.

As an example, an electromagnet 5 is in the rotating shaft 3. The flexible display device further includes an angle sensor 31 and a controller 32 disposed in the rotating shaft 3. The angle sensor 31 is coupled to the rotating shaft 3 to sense the angle change of the rotating shaft relative to the flexible display screen. The controller 32 is configured to control the electromagnet 5 to be powered to generate magnetism that attracts the support layer 4 when the angle sensor 31 detects that the rotating shaft 3 starts to rotate to make the flexible display screen 1 unfolded from the folded state, so that the flexible display screen can be unfolded more quickly, resulting in the flexible display screen 1 in a desired unfolded state.

In the technical solution of the flexible display device provided by this embodiment, the flexible display device includes a flexible display screen 1 and a housing 2 outside the flexible display screen 1. The housing 2 includes the main structure 21 provided with the rotating shaft 3 and the side structure 22. The support layer 4 is disposed on the back side of the flexible display screen, and in this embodiment, the support layer 4 has the function of supporting the flexible display screen 1 and reduces the inconvenience of touch operations due to the softness of the flexible display screen when touched. In this embodiment, the quick resilience of the support layer 4 can pull the flexible display screen to be unfolded, so that no protrusion appears at the folded position.

Figure 4:
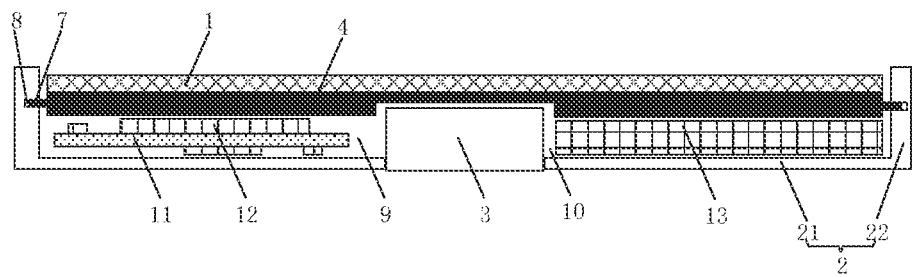
FIG. 4 is a schematic structural diagram of a flexible display device according to some embodiments of the present disclosure.

FIG. 4 is a schematic structural diagram of a flexible display device according to some embodiments of the present disclosure. As shown in FIG. 4, in this embodiment on the basis of the above embodiments, an end face of the support layer 4 is provided with a first snap fit structure 7, the side structure 22 is provided with a second snap fit structure 8 corresponding to the first snap fit structure 7, and the first snap fit structure 7 is embedded in the corresponding second snap fit structure 8 to fix the support layer 4 to the housing 2.

In this embodiment, the first snap fit structure 7 is a protrusion structure, and the second snap fit structure 8 is a groove structure. The protrusion structure and the support layer 4 may be integrally formed as a single piece. The first snap fit structure 7 and the second snap fit structure 8 are corresponding to one another. In this embodiment, the support layer 4 and the side structure 22 are in snap fit, so that the flexible display screen 1 can be assembled into the whole device from top to bottom, and the flexible display screen can be conveniently disassembled and assembled from and to the whole device when required to be maintained, thereby facilitating the protection and assembly of the whole device.

As an example, the electromagnet 5 is in the rotating shaft 3. The flexible display device further includes an angle sensor 31 and a controller 32 disposed in the rotating shaft 3. The angle sensor 31 is coupled to the rotating shaft 3 to sense the angle change of the rotating shaft relative to the flexible display screen. The controller 32 is configured to control the electromagnet 5 to be powered to generate magnetism that attracts the support layer 4 when the angle sensor 31 detects that the rotating shaft 3 starts to rotate to make the flexible display screen 1 unfolded from the folded state, so that the flexible display screen can be unfolded more quickly, resulting in the flexible display screen 1 in a desired unfolded state.

In this embodiment, a first accommodating space 9 and a second accommodating space 10 are between the flexible display screen 1 and the main structure 21, and the rotating shaft 3 is between the first accommodating space 9 and the second accommodating space 10. A main board of the flexible display screen is in the first accommodating space 9, and is a printed circuit board (PCB) or a printed wire board (PWB). In the figures, chips 12 are on the upper side and the lower side of the printed circuit board 11. A battery 13 is in the second accommodating space 10. As an example, at least one of the upper and lower sides of the printed circuit board is provided with the chips.

In particular, the first accommodating space 9 may be enclosed by the support layer 4, the side structure 22 on one side, the main structure 21 and the rotating shaft 3; the second accommodating space 10 may be enclosed by the support layer 4, the side structure 22 on the other side, the main structure 21 and the rotating shaft 3.

In the technical solution of the flexible display device provided by this embodiment, the flexible display device includes a flexible display screen 1 and a housing 2 outside the flexible display screen 1. The housing 2 includes the main structure 21 provided with the rotating shaft 3 and the side structure 22. The support layer 4 is disposed on the back side of the flexible display screen, and in this embodiment, the support layer 4 has the function of supporting the flexible display screen 1 and reduces the inconvenience of touch operations due to the softness of the flexible display screen when touched. In this embodiment, the quick resilience of the support layer 4 can pull the flexible display screen to be unfolded, so that no protrusion appears at the folded position.

Figure 5:
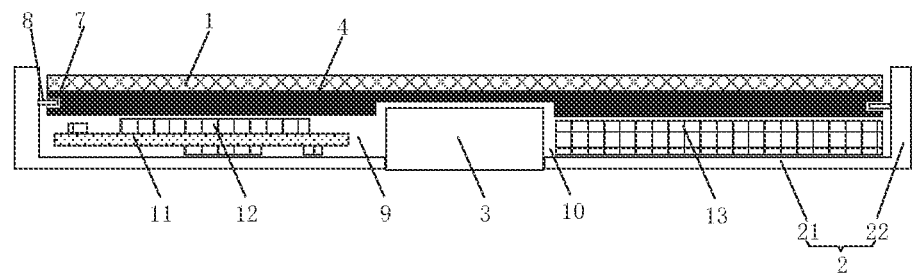
FIG. 5 is a schematic structural diagram of a flexible display device according to some embodiments of the present disclosure.

FIG. 5 is a schematic structural diagram of a flexible display device according to some embodiments of the present disclosure. As shown in FIG. 5, the present embodiment is different from the above embodiments in that the first snap fit structure 7 is a groove structure, the second snap fit structure 8 is a protrusion structure, and the second snap fit structure 8 is embedded into the corresponding first snap fit structure 7 to fix the support layer 4 to the housing 2. In this embodiment, the support layer 4 and the side structure 22 are in snap fit, so that the flexible display screen 1 can be assembled into the whole device from top to bottom, and the flexible display screen can be conveniently disassembled and assembled from and to the whole device when required to be maintained, thereby facilitating the protection and assembly of the whole device.

As an example, the electromagnet 5 is in the rotating shaft 3. The flexible display device further includes an angle sensor 31 and a controller 32 disposed in the rotating shaft 3. The angle sensor 31 is coupled to the rotating shaft 3 to sense the angle change of the rotating shaft relative to the flexible display screen. The controller 32 is configured to control the electromagnet 5 to be powered to generate magnetism that attracts the support layer 4 when the angle sensor 31 detects that the rotating shaft 3 starts to rotate to make the flexible display screen 1 unfolded from the folded state, so that the flexible display screen can be unfolded more quickly, resulting in the flexible display screen 1 in a desired unfolded state.

Figure 6:
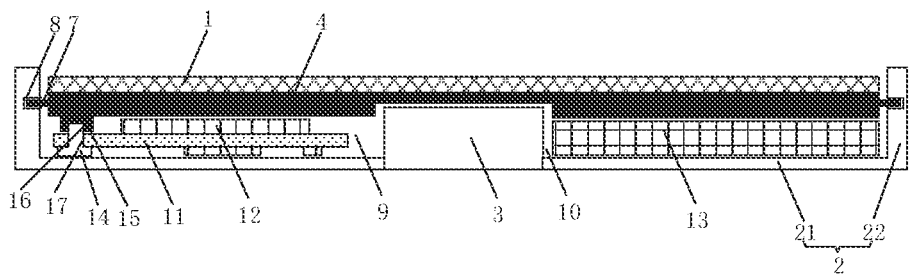
FIG. 6 is a schematic structural diagram of a flexible display device according to some embodiments of the present disclosure.

FIG. 6 is a schematic structural diagram of a flexible display device according to some embodiments of the present disclosure. As shown in FIG. 6, in this embodiment, on the basis of the embodiment shown in FIG. 4, the first accommodating space 9 and the second accommodating space 10 are between the flexible display screen 1 and the main structure 21, and the rotating shaft 3 is between the first accommodating space 9 and the second accommodating space 10. The printed circuit board 11 and the chips 12 are in the first accommodating space 9, and the chips 12 are on the upper side and the lower side of the printed circuit board 11. The battery 13 is in the second accommodating space 10.

In particular, the first accommodating space 9 may be enclosed by the support layer 4, the side structure 22 on one side, the main structure 21 and the rotating shaft 3; the second accommodating space 10 may be enclosed by the support layer 4, the side structure 22 on the other side, the main structure 21 and the rotating shaft 3.

As an example, the flexible display device further includes a screw 14. One side of the support layer 4 close to the printed circuit board 11 is provided with a protrusion portion 15, and the protrusion portion 15 is provided with a screw hole 16. The printed circuit board 11 is provided with a through hole 17 corresponding to the screw hole 16. The screw 14 penetrates through the through hole 17, and the screw 14 is assembled with the screw hole 16 to fix the support layer 4 to the printed circuit board 11. The screw hole 16 is provided with internal threads, and the through hole may be provided with internal threads matched with the internal threads in the screw hole 16, or may be a hole without internal threads.

As an example, the electromagnet 5 is in the rotating shaft 3. The flexible display device further includes an angle sensor 31 and a controller 32 disposed in the rotating shaft 3. The angle sensor 31 is coupled to the rotating shaft 3 to sense the angle change of the rotating shaft relative to the flexible display screen. The controller 32 is configured to control the electromagnet 5 to be powered to generate magnetism that attracts the support layer 4 when the angle sensor 31 detects that the rotating shaft 3 starts to rotate to make the flexible display screen 1 unfolded from the folded state, so that the flexible display screen can be unfolded more quickly, resulting in the flexible display screen 1 in a desired unfolded state.

In this embodiment, the support layer 4 and the printed circuit board 11 are fixed by the screw 14, so that the printed circuit board 11 is locked, and the whole device is protected and assembled conveniently.

Figure 7:
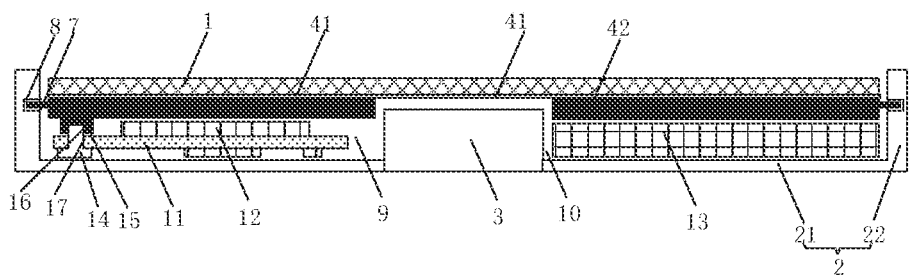
FIG. 7 is a schematic structural diagram of a flexible display device according to some embodiments of the present disclosure.

FIG. 7 is a schematic structural diagram of a flexible display device according to some embodiments of the present disclosure. As shown in FIG. 7, on the basis of the above embodiments, the support layer 4 includes a first metal sheet 41 and a second metal sheet 42, the first metal sheet 41 and the second metal sheet 42 are adhered together by a double-sided adhesive tape, and the first metal sheet 41 and the flexible display screen 1 are adhered together by a double-sided adhesive tape. The first snap fit structure 7 is disposed on the second metal sheet 42, a protrusion portion 15 is disposed on one side of the second metal sheet 42 close to the printed circuit board 11, and the protrusion portion 15 is provided with a screw hole 16. The printed circuit board 11 is provided with a through hole 17 corresponding to the screw hole 16. The screw 14 penetrates through the through hole 17, and the screw 14 is assembled with the screw hole 16 to fix the support layer 4 to the printed circuit board 11.

As an example, the protrusion portion 15 on the second metal sheet 42 is configured integrated with the second metal layer as an entirety or a single piece. As an example, the protrusion portion 15 on the second metal sheet 42 is formed separately from the second metal sheet 42 and is attached to the second metal sheet 42 by adhesive.

As an example, the first snap fit structure 7 is a groove structure, the second snap fit structure 8 is a protrusion structure, and the second snap fit structure 8 is embedded into the corresponding first snap fit structure 7 to fix the support layer 4 to the housing 2.

As an example, the electromagnet 5 is in the rotating shaft 3. The flexible display device further includes an angle sensor 31 and a controller 32 disposed in the rotating shaft 3. The angle sensor 31 is coupled to the rotating shaft 3 to sense the angle change of the rotating shaft relative to the flexible display screen. The controller 32 is configured to control the electromagnet 5 to be powered to generate magnetism that attracts the support layer 4 when the angle sensor 31 detects that the rotating shaft 3 starts to rotate to make the flexible display screen 1 unfolded from the folded state, so that the flexible display screen can be unfolded more quickly, resulting in the flexible display screen 1 in a desired unfolded state.

In this embodiment, the first metal sheet 41 has the function of supporting the flexible display screen 1 and reduces the inconvenience of touch operations due to the softness of the flexible display screen when touched. The quick resilience of the support layer 4 can pull the flexible display screen to be unfolded, so that no protrusion appears at the folded position. The second metal sheet 42 is fixed to the side structure 22 of the housing 2 by the snap fit structure; the second metal sheet 42 is fixed to the printed circuit board 11 by the screw 14, so that the battery 13 is locked, and the protection and assembly of the whole device are facilitated.

In the technical solution of the flexible display device provided by this embodiment, the flexible display device includes a flexible display screen 1 and a housing 2 outside the flexible display screen 1. The housing 2 includes the main structure 21 provided with the rotating shaft 3 and the side structure 22. The support layer 4 is disposed on the back side of the flexible display screen, and in this embodiment, the support layer 4 has the function of supporting the flexible display screen 1 and reduces the inconvenience of touch operations due to the softness of the flexible display screen when touched. In this embodiment, the quick resilience of the support layer 4 can pull the flexible display screen to be unfolded, so that no protrusion appears at the folded position.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

The invention claimed is:

1. A flexible display device, comprising:
a flexible display screen having a bendable region;
a housing around the flexible display screen; and
a support layer having ductility between the housing and a back side of the flexible display screen,
wherein the support layer is at least partially in the bendable region of the flexible display screen, and
the housing has a bendable region corresponding to the bendable region of the flexible display screen, the support layer comprises a first metal layer and a second metal layer, the first metal layer is on the back side of the flexible display screen, the second metal layer is on a side of the first metal layer close to the housing and on both sides of the bendable region of the housing,
wherein a main structure of the housing comprises a first portion and a second portion on two sides of the bendable region of the housing, and the bendable region between the first portion and the second portion is provided with a rotating shaft configured to allow the first portion and the second portion to rotate relatively to make the housing bent,
wherein a first accommodating space and a second accommodating space are between the second metal layer on the two sides of the bendable region of the housing and an inner surface of the housing, respectively,
the first accommodating space is provided with a circuit board, and at least one of an upper side and a lower side of the circuit board is provided with a chip; and the second accommodating space is provided with a battery, and a side of the second metal layer close to the circuit board is provided with a protrusion portion, and the protrusion portion is fixedly coupled to the circuit board.

2. The flexible display device of claim 1, wherein the housing comprises the main structure and at least one side structure, the main structure being on the back side of the flexible display screen, the side structure being on an end face of the flexible display screen.

3. The flexible display device of claim 2, wherein the housing comprises two side structures on two opposite end faces of the flexible display screen, sides of the two side structures of the housing close to the flexible display screen are provided with two opposite groove structures, respectively, sides of the support layer close to the two groove structures are provided with two opposite protrusion structures, respectively, and each of the groove structures is coupled to its close protrusion structure in snap fit.

4. The flexible display device of claim 3, wherein
the two protrusion structures are on the second metal layer at positions close to the two opposite groove structures.

5. The flexible display device of claim 2, wherein the housing comprises two side structures on two opposite end faces of the flexible display screen, sides of the two side structures of the housing close to the flexible display screen are provided with two opposite protrusion structures, respectively, sides of the support layer close to the two groove structures are provided with two opposite groove structures, respectively, and each of the groove structures is coupled to its close protrusion structure in snap fit.

6. The flexible display device of claim 5, wherein
the two groove structures are on the second metal layer at positions close to the two opposite protrusion structures, respectively.

7. The flexible display device of claim 1, wherein a surface of the support layer facing the flexible display screen is flat, and the support layer is attached to the flexible display screen snugly.

8. The flexible display device of claim 1, wherein the protrusion portion is provided with a screw hole; the circuit board is provided with a through screw hole penetrating through the circuit board and communicating with the screw hole, and the circuit board is fixedly coupled to the protrusion portion through a screw linking the screw hole with the through screw hole.

9. The flexible display device of claim 1, wherein the protrusion portion on the second metal layer and the second metal layer are formed as a single piece; or
the protrusion portion on the second metal layer is separately formed from the second metal layer and is coupled to the second metal layer through adhesive.

10. The flexible display device of claim 1, wherein the housing is provided with the rotating shaft in the bendable region of the housing, an electromagnet is in the rotating shaft, and the electromagnet is configured to have magnetism to attract the support layer when being powered.

11. The flexible display device of claim 10, wherein the flexible display device further comprises:
an angle sensor coupled to the rotating shaft and configured to sense an angle change of the rotating shaft relative to the flexible display screen; and
a controller configured to control the electromagnet to be powered to have magnetism to attract the support layer when the angle sensor detects that the rotating shaft starts to rotate to make the flexible display screen unfolded from a folded state.

12. The flexible display device of claim 1, wherein the first metal layer extends from the bendable region of the housing to a non-bendable region of the housing other than the bendable region of the housing, and the second metal layer is on the non-bendable region of the housing only.

\* \* \* \* \*